UNITED STATES PATENT OFFICE.

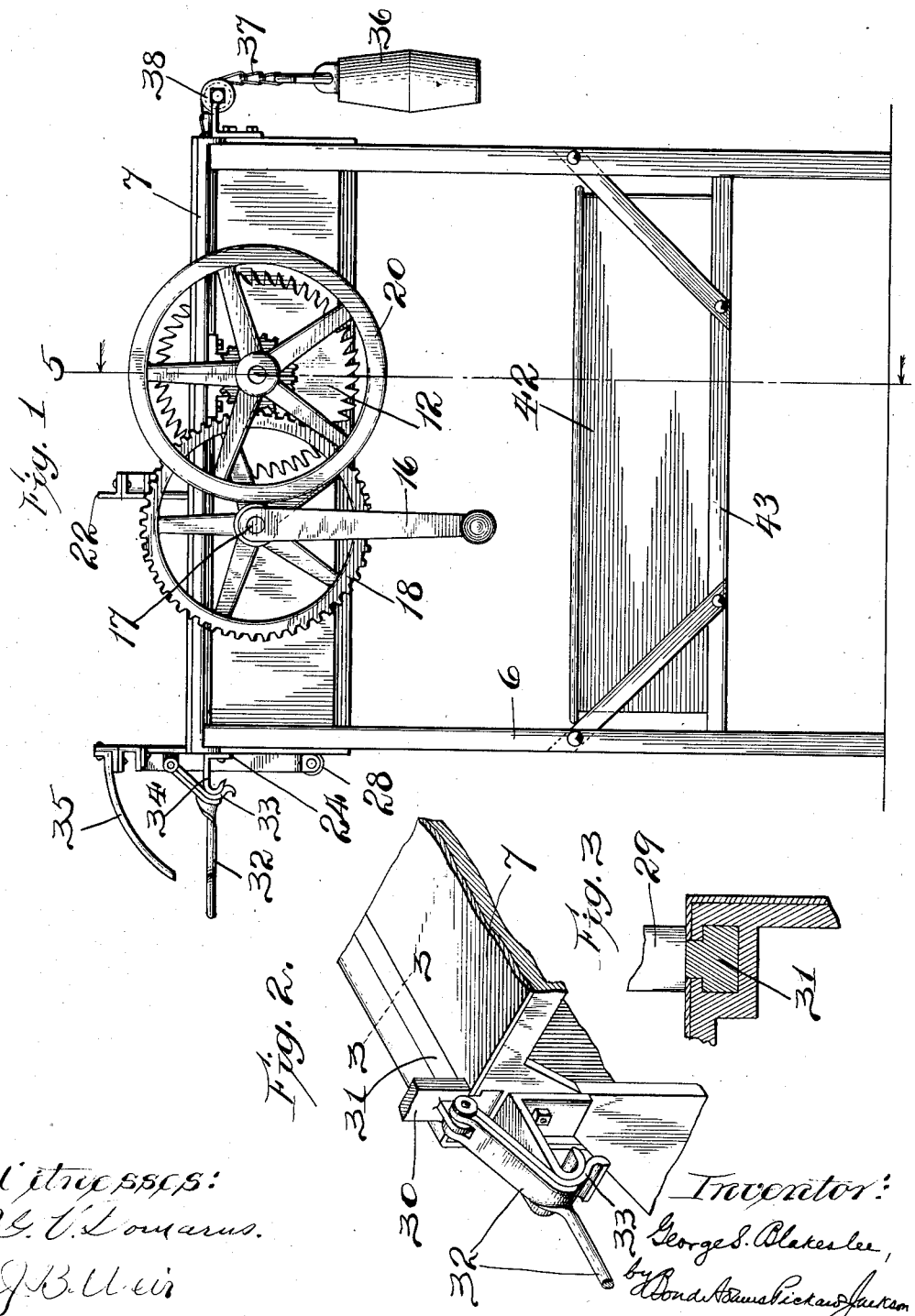

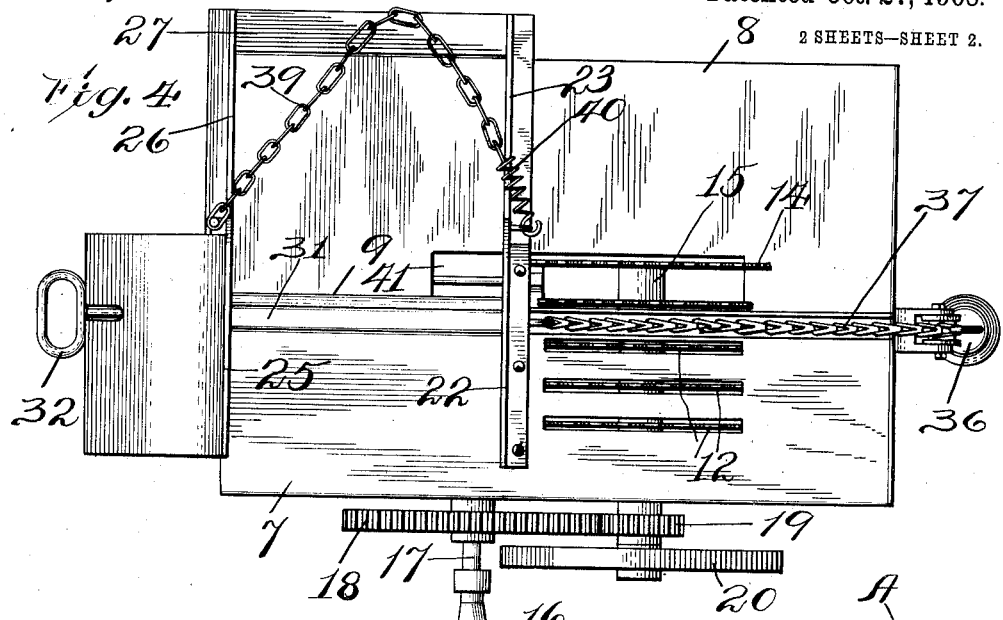
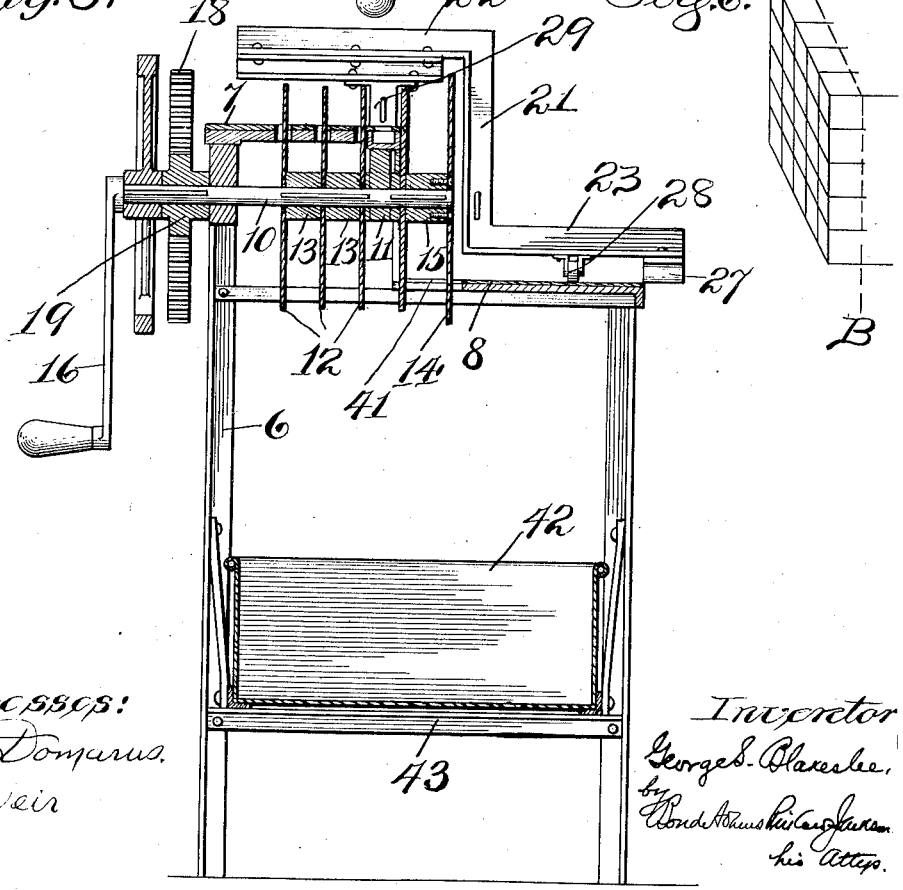

GEORGE S. BLAKESLEE, OF CHICAGO, ILLINOIS.

ICE-CUTTING MACHINE.

No. 902,200.　　　　Specification of Letters Patent.　　　Patented Oct. 27, 1908.

Application filed July 20, 1904. Serial No. 217,422.

*To all whom it may concern:*

Be it known that I, GEORGE S. BLAKESLEE, a citizen of the United States, and residing at Chicago, in the county of Cook and State of Illinois, have invented certain new and useful Improvements in Ice-Cutting Machines, of which the following is a specification, reference being had to the accompanying drawings.

My invention relates to machines for cutting ice, and has for its object to provide a new and improved machine for cutting masses of ice into the form of small cubes.

It consists of a suitable stand or frame adapted to support the working parts of the machine, upon which is mounted mechanism by which the block of ice is first scored to a depth equal to or greater than one dimension of the cubes to be cut,—the scoring being checkered in design. The frame also is provided with tables on different levels for supporting the ice, and carries means for cutting the block in a plane parallel with the surface scored, so that the several blocks are cubical in form. Thus a large number of cubes may be produced in a very short space of time and by very few operations.

In the accompanying drawings,—Figure 1 is a side elevation of my improved machine; Fig. 2 is an enlarged perspective detail; Fig. 3 is a section on line 3—3 of Fig. 2; Fig. 4 is a plan view; Fig. 5 is a cross section on line 5—5 of Fig. 1; and Fig. 6 is a perspective view, illustrating the design of the scorings.

Referring to the drawings,—6 indicates a stand, which may be of any suitable construction but is preferably made of iron or steel. It is provided with upper and lower tables 7—8, respectively, upon which the mass of ice to be cut is adapted to rest during different stages of the operation.

9 indicates the inner wall of the table 8, against which the ice is adapted to bear when it rests on the table 8.

10 indicates a shaft, which is mounted in suitable bearings in the frame 6 and in a bearing-block 11 which depends from the table 7, as shown in Fig. 5.

12 indicates a series of circular saws which are mounted upon and keyed to the shaft 10. The saws 12 are set equally distant apart, being held in the proper relative position by sleeves 13 mounted on the shaft 10, as shown.
14 indicates a saw, somewhat greater in diameter than the saws 12, which is fitted upon the inner end of the shaft 10 and is separated from the nearest saw 12 by a sleeve 15 to which it is preferably screwed, as shown in Fig. 5. The saw 12, which lies nearest the saw 14, is arranged in line with the inner wall 9 of the table 8, as best shown in Fig. 4. The shaft 10 is rotated to operate the saws 12—14 by means of a crank 16 mounted on a stud 17 which projects from one side of the frame. The crank 16 is connected with a gear-wheel 18, which meshes with a pinion 19 mounted on the shaft 10, as shown in Figs. 1 and 5.

20 indicates a balance-wheel mounted on the shaft 10. By this construction the saws 12 may be rotated simultaneously and at a high rate of speed.

21 indicates the vertical portion, and 22—23 upper and lower horizontal portions of the front member of a traveling-frame which is arranged to move longitudinally of the tables 7—8. The upper horizontal portion 22 lies over the table 7. The lower portion 23 extends over the table 8, while the vertical portion 21 extends down parallel with and adjacent to the outer face of the saw 14. Similarly, 24 indicates the vertical portion and 25—26 the upper and lower horizontal portions, respectively, of the rear member of said traveling-frame. The parts 23—26 are connected by a member 27, which is parallel with and adjacent to one of the sides of the machine-frame, as shown in Figs. 4 and 5.

28 indicates rollers, which support the portions 23—26 and run on the table 8. The upper portions 22—25 of the traveling-frame are connected by standards 29—30 (see Figs. 2, 3 and 5) with a slide-block 31, which moves in a suitable groove provided near the inner edge of the table 7, as best shown in Figs. 2 and 3. By this construction the traveling-frame is made to move longitudinally of the machine-frame, and is held properly in position.

32 indicates a handle, which is connected to the rear member of the traveling-frame,— that is to say, the member which lies at the left, as shown in Fig. 4. The handle 32 carries a hook 33 adapted to engage a catch 34 secured to the machine-frame, as shown in Fig. 1. By raising the handle 32, the hook 33 may be disengaged, setting the traveling-frame free.

35 indicates a shield, which extends over the handle 32 and moves with the traveling-frame.

36 indicates a counterbalance-weight, which is connected by a chain 37, or other flexible connection, to the front member of the traveling-frame, working over a pulley 38 secured to the machine-frame, as shown in Figs. 1 and 4. The weight 36 operates to carry the ice against the saws. It is drawn back by hand. As best shown in Fig. 5, the saws 12 project up through the table 7,—suitable slots being provided where necessary for that purpose. The saw 14 also projects up beyond the surface of the table 7, and, as shown in Fig. 4, it is set away from the wall 9 a distance equal to the space between consecutive saws.

In use a block of ice is placed on the table 7 in front of the rear member of the traveling-frame. The traveling-frame is then released by raising the handle 32, allowing the counterbalance-weight to move the block of ice against the saws, which score it on the under side along parallel lines. It will be understood that the saws project above the table 7 a distance equal at least to one dimension of the cubes to be cut. After the first scoring, the block of ice is turned at right angles to its former position and is then again moved against the saws which score it again in lines at right angles to the former scoring. The block of ice is then turned on edge and placed on the table 8 between the members of the traveling-frame and its scored surface is pressed closely against the wall 9. The ice is secured in this position by means of a chain 39, the ends of which are secured to the traveling-frame in such manner that one end is readily detachable. The chain 39 is adapted to embrace the ice and hold it firmly against the wall 9. A spring 40 is provided, either at one end of the chain 39 or at some intermediate point thereof, to provide for accommodating blocks of ice of different sizes. The block of ice turned on edge, as described, is then moved against the saw 14,—the greater portion of which lies above the table 8,—and by the action of said saw the scored portion of the mass of ice is cut in a plane parallel with the scored surface,—thereby severing cubes of ice from the mass. As the cubes are severed, they drop down through a slot 41 provided in the table 8 for that purpose, as shown in Figs. 4 and 5, and are received in a pan, or other receptacle, 42, placed to intercept them. The pan 42 is preferably supported on cross-bars 43 secured to the machine-frame, as shown in Fig. 5. The design of the scorings is illustrated in Fig. 6,—the final cutting being indicated by dotted lines A—B.

By arranging the saw 14 in the manner described, and providing tables 7—8 on different levels, I am enabled to utilize said saw both for scoring and for cutting, and the cutting may be of the full width of the surface scored, thereby facilitating, as well as expediting, the work.

It will be understood, of course, that the term "cube", as herein employed, is used in a generic sense and is not to be restricted to its mathematical sense, since, obviously, it is not essential to my invention that the masses of ice produced be true cubes. The changes necessary to produce blocks of other forms having plane surfaces will readily suggest themselves to any skilled mechanic familiar with the art, and my invention is, therefore, not to be restricted to a machine adjusted to produce cubes alone.

It should be understood, also, that while I have described my improved machine in detail, as illustrated in the accompanying drawings, my invention is not restricted to such details of construction, except in so far as they are particularly claimed, but includes the generic invention set forth in the broader claims.

That which I claim as my invention and desire to secure by Letters Patent is,—

1. A machine for cutting cubical blocks, comprising a plurality of parallel scoring-saws, a severing-saw parallel with said scoring-saws, a table for supporting the material while being scored, and a table on a different level for supporting the material while being severed into blocks, said severing-saw projecting over the latter table.

2. A machine for cutting cubical blocks, comprising a drive-shaft, a plurality of parallel scoring-saws mounted on said shaft, a severing-saw parallel with said scoring-saws and mounted on said shaft, a table for supporting the material while being scored, and a table on a different level for supporting the material while being severed into blocks said severing saw extending above the latter table to engage the material thereon.

3. A machine for cutting cubical blocks, comprising a plurality of parallel scoring-saws, a severing-saw parallel with said scoring-saws and of greater diameter, a table for supporting the material while being scored, and a table on a different level for supporting the material while being severed into blocks said severing saw extending above the latter table to engage the material thereon.

4. A machine for cutting cubical blocks, comprising a plurality of parallel scoring-saws, a severing-saw parallel with said scoring-saws, a scoring table above the axis of said scoring-saws, and a cutting table below the axis of said severing-saw.

5. A machine for cutting cubical blocks, comprising a plurality of parallel scoring saws, a severing saw parallel with said scoring saws, a shaft on which said saws are mounted, a table for supporting the material while being scored, and a table on a lower level for supporting the material while being severed into blocks, said severing saw extending above the latter table to engage the material thereon.

6. A machine for cutting cubical blocks, comprising a plurality of parallel scoring-saws, a severing-saw parallel with said scoring-saws, a table for supporting the material while being scored, a table on a different level for supporting the material while being severed into blocks, and a frame traveling on both of said tables for feeding the material to said saws.

7. A machine for cutting cubical blocks, comprising a plurality of parallel scoring-saws, a severing-saw parallel with said scoring-saws, a table for supporting the material while being scored, a table on a different level for supporting the material while being severed into blocks, a frame traveling on both of said tables for feeding the material to said saws, and counterbalance mechanism for moving said frame in one direction.

8. A machine for cutting cubical blocks, comprising a plurality of parallel scoring saws, a severing saw parallel with said scoring saws, a table for supporting the material while being scored, a table on a lower level for supporting the material while being severed into blocks, said severing saw extending above the latter table to engage the material thereon, and means traveling over both of said tables for feeding the material to the saws.

9. A machine for cutting cubical blocks, comprising a scoring table on which the material to be cut is adapted to rest, a plurality of scoring saws projecting above said table for scoring the under surface of the material, a severing table on a different level from said scoring table, and a severing saw parallel with said scoring saws and adapted to cut said material in a plane substantially parallel with the surface scored.

GEORGE S. BLAKESLEE.

Witnesses:
JOHN L. JACKSON,
CHARLES E. PICKARD.